United States Patent [19]
Gould

[11] 4,129,060
[45] Dec. 12, 1978

[54] SCREW HEAD COVER

[75] Inventor: William Gould, Millburn, N.J.

[73] Assignee: Nyltite Corporation, South Plainfield, N.J.

[21] Appl. No.: 850,143

[22] Filed: Nov. 10, 1977

[51] Int. Cl.² .................... A47G 3/00; F16B 15/02
[52] U.S. Cl. ............................................ 85/53; 85/52
[58] Field of Search ............... 85/54, 53, 55, 56, 52, 85/62; 248/74 A, 74 PB; 24/217

[56] References Cited

U.S. PATENT DOCUMENTS

| 1,613,921 | 1/1927 | Berge | 85/55 |
| 3,396,434 | 8/1968 | Overhoff | 85/54 X |
| 3,538,557 | 11/1970 | Hirose | 24/217 |
| 3,769,664 | 11/1973 | Parera | 24/217 |
| 3,882,752 | 5/1975 | Gutshall | 85/50 R X |
| 4,023,758 | 5/1977 | Yuda | 248/74 PB X |

FOREIGN PATENT DOCUMENTS 894867  4/1962  United Kingdom ................. 248/74 A Primary Examiner—Rodney H. Bonck
Attorney, Agent, or Firm—Howard C. Miskin

[57] ABSTRACT

A self closing cover for the head of a screw is integrally formed of a resilient polymeric resin and includes a flat annular washer having upwardly projecting closure flaps along its periphery and connected to the washer for swinging to interfitting dome defining positions overlying the washer. A flap closing finger depends from each of the closure flaps and with the tightening of the screw toward a work surface, the work surface bears on and swings the fingers to swing the flaps to their closed positions.

9 Claims, 3 Drawing Figures

U.S. Patent
Dec. 12, 1978
4,129,060
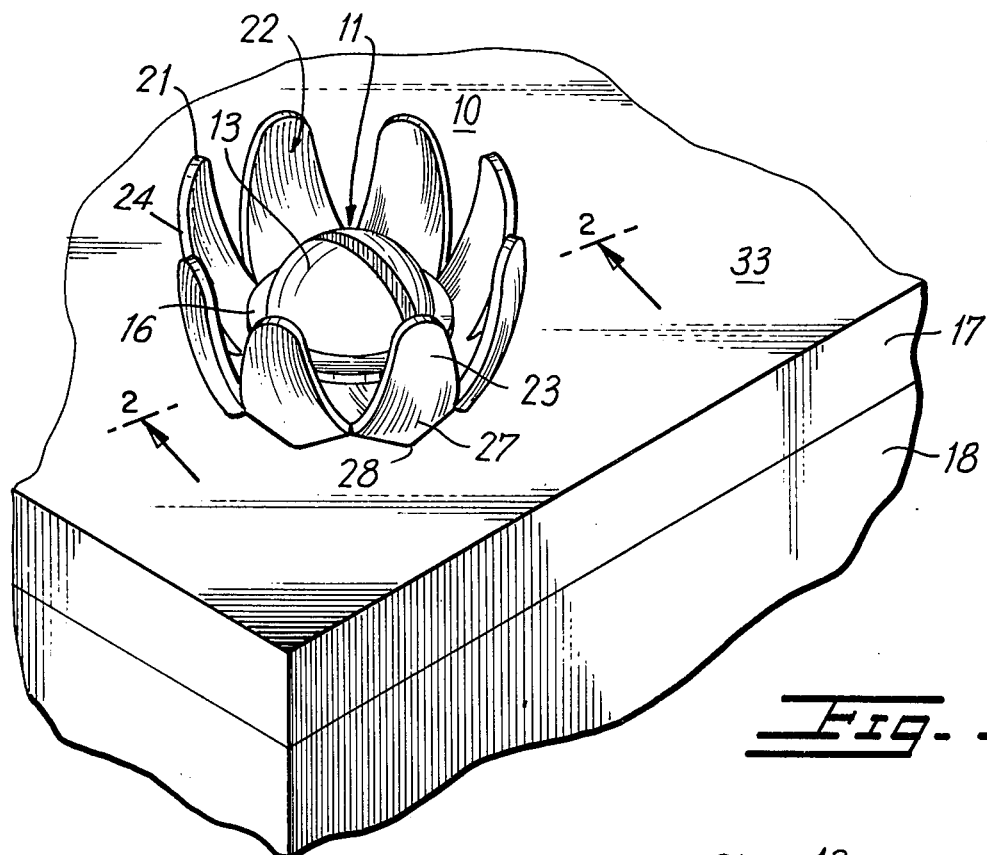
_Fig. 1._
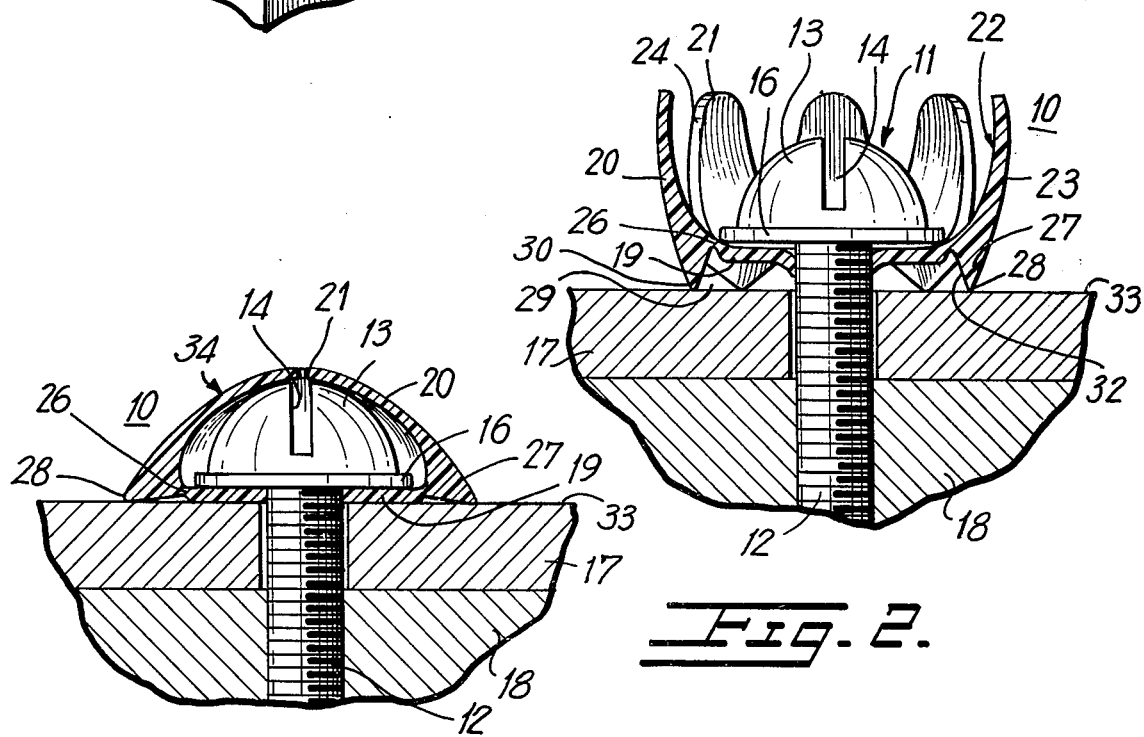
_Fig. 2._
_Fig. 3._

SCREW HEAD COVER

BACKGROUND OF THE INVENTION

The present invention relates generally to improvements in fastening devices and it relates more particularly to an improved device for covering the head of a screw applied to a work piece.

In the construction of many articles, screws or similar headed fasteners are employed in the assembly of the article, the shank of the fastener engaging the work piece and in many positions the screw or fastener heads are visible and apparent on one or more faces of the article, thus not only affording a highly unattractive appearance but providing sharp and abrasive projections. Many types of devices have heretofore been employed or proposed for covering the fastener heads but these possess numerous drawbacks and disadvantages. They are generally awkward devices which are difficult and inconvenient to employ requiring additional steps to effect their closure, thus being highly time-consuming to use and being of very limited adaptability.

SUMMARY OF THE INVENTION

It is therefore a principal object of the present invention to provide an improved fastener device.

Another object of the present invention is to provide a closure device for the heads of screws and other fasteners having enlarged heads and connecting shanks.

Still another object of the present invention is to provide a screw head cover device of highly attractive appearance which serves numerous other desirable functions such as affording an anti-vibration seal, protecting the fastener and head from the ambient environment and the like.

A further object of the present invention is to provide an improved device of the above nature characterized by its reliability, ruggedness, low cost, highly attractive appearance, ease, convenience and speed of application and its high versatility and adaptability.

The above and other objects of the present invention will become apparent from a reading of the following description taken in conjunction with the accompanying drawing which illustrates a preferred embodiment thereof.

In a sense the present invention contemplates the provision of a covering device for the head of a screw or other headed fastener comprising a body member having top and bottom faces and an opening for the reception of the shank of the fastener, an upwardly projecting wing member integrally formed with and hinged to the body member at a point transversely offset from the opening and closing means responsive to axial pressure on the body member for swinging the wing inwardly toward a position overlying the top face.

According to a preferred form of the improved device, it is integrally formed of a resilient thermoplastic synthetic organic polymeric resin, the body member comprising a flat annular washer. A plurality of wing members are spaced along the periphery of the washer and are connected thereto by self-hinges and are petal shaped and swingable from their normal upright positions to closed positions interfitting to form a dome overlying the washer. Depending from each of the wing members is a closure finger which, upon the tightening of an associated fastener toward a work surface, is engaged by the work surface to swing the finger outwardly and the wing inwardly to its closed position.

The improved fastener head closure device is attractive, reliable, rugged and of low cost and is easy and convenient to use, operating to automatically close with the tightening of the fastener and is of great versatility and adaptability.

BRIEF DESCRIPTION OF THE DRAWING

FIG. 1 is a perspective view of the improved closure device shown carried by a screw applied to a work piece and illustrated in its open condition;

FIG. 2 is a sectional view taken along line 2—2 in FIG. 1; and

FIG. 3 is a view similar to FIG. 2 with the fastener shown in its tightened position and the closure device closed.

DESCRIPTION OF THE PREFERRED EMBODIMENT

Referring now to the drawing which illustrates a preferred embodiment of the present invention, the reference numeral 10 generally designates the improved fastener head closure device which is illustrated as applied to a screw 11. The screw 11 is of conventional construction and includes a threaded shank 12 topped by an enlarged head 13 having a screw driver receiving slot 14 and underlying the flat undersurface of the screw head 13 is an annular metal washer 16 which projects beyond the periphery of screw head 13 and may be integrally formed therewith. The screw 11 is shown, by way of example, applied to a work piece including a body member 17 having a tapped bore and overlaid by a flat plate 18 having a smooth bore coaxial with the tapped bore. The screw shank 12 registers with the smooth bore and engages the tapped bore and the screw 11 may be tightened to draw the screw head to the plate 18 and lock in its assembled condition with body member 17.

The closure device 10 is formed of a resilient synthetic organic polymeric resin such as polyethylene, polypropylene, nylon, polyvinyl chloride or the like, and may be fabricated by injection molding as integral units. The closure device 10 includes a screw shank engaging section 19 of the shape of a flat annular washer having a central opening advantageously of slightly lesser diameter than that of screw shank 12 so that the screw shank 12 may be inserted through the opening to bring the underface of screw head 13 in close proximity to the top face of washer section 19, slightly deforming the border of the opening which embraces the screw shank and retains the device 10 to the screw shank 12.

Regularly circumferentially spaced about the periphery of washer section 19 in side-by-side relationship is a plurality of petal shaped head closure defining wing members 20 which in their normal unstressed condition, are upwardly directed. Each of the wing members 20 tapers upwardly to a rounded apex 21 and includes an enlarged base, and a concave inner face 22, a convex outer face 23, and upwardly converging slightly convex side edges 24, the bottoms of the adjacent side edges 24 of successive wing members 20 joining each other. Each wing member 20 is joined at its base to the periphery of washer section 19 by a self-hinge of reduced thickness to facilitate the swinging of the wing member 20 inwardly about the periphery of the washer section 19. The inside faces 22 of the wing members smoothly merge with the top face of washer section 19.

Depending from the base of each of the wing members 20 and integrally formed therewith is a pyramidshaped closure actuating finger 27. Each finger 27 has a bottom apex 28 which, in the open upright position of the corresponding wing member 20, is below the level of the washer section 19, and may be slightly outwardly directed. The side faces 29 of fingers 27 are triangular and diverge upwardly to the wing member side faces 24, the outside faces 30 of fingers 27 merge with the outside faces 23 of wing members 20, and the inside faces 32 of fingers 27 extend to the bases of wing member inside faces 22 at the self hinges 26. In the pre-assembled condition of the closure device 10 and screw 11, with the closure device open, as shown in FIGS. 1 and 2, the bottom of metal washer 16 engages the peripheral border of the top face of the washer section 19 in the proximity of the self hinges 26.

Considering now the application and operation of the improved closure device 10 described above, the screw 11 and closure device 10, pre-assembled as illustrated in FIGS. 1 and 2, and as earlier explained are applied to the work piece by inserting the screw shank 12 through the opening in plate 18 and into engagement with the tapped bore in body member 17 and the screw is then turned and tightened by a screw driver engaging screw head slot 14. As the screw head 13 and closure device 10 approach the top face 33 of plate 18 the finger apices 28 engage the top face 33 and with further tightening of screw 11 the pressure of top face 33 on the finger apices 33 causes the fingers 27 to swing outwardly and this, in turn, swings the wing members 20 inwardly. When the screw 11 is fully tightened so that the washer section 19 is tightly sandwiched and embraced between the confronting faces of washer section 19 and washer 16 the fingers 27 are radially outwardly directed and the wing members 20 converge upwardly to form a dome-shaped enclosure 34, the apices 21 defining a slight opening and the adjacent wing member side edges 24 extending along each other. The dome-shaped enclosure 34 overlies the washer section 19 and covers the screw head 13. It should be noted that the wing members 20 may be so shaped as to so interfit when closed to form an imperforate dome shaped enclosure. Upon completion of tightening of the screw 11, the wing member apices 21 resiliently bear on the screw driver shank which may then be removed to permit the wing members 20 to snap to their closed condition. The screw 11 may be loosened and removed if desired by inserting a screw driver through the opening in the top of the dome enclosure 34, spreading the resilient wing members 20, if necessary, and turning the screw with the screw driver engaging the slot 14.

While there has been described and illustrated a preferred embodiment of the present invention, it is apparent that numerous alterations, omissions, and additions may be made without departing from the spirit thereof.

I claim:

1. A fastener head covering device comprising a body member having top and bottom faces and an opening for the reception of the shank of a fastener, a plurality of peripherally spaced upwardly projecting wing members integrally formed with and hinged to said body member along the peripheral border thereof, said wing members having side-by-side bases and closing means responsive to axial pressure on said body member to swinging said wing members inwardly toward a position forming a substantially closed cap overlying said top face.

2. The device of claim 1 wherein said closing means comprises an integrally formed fingers depending from said wing members below the level of said bottom face and swingable outwardly in response to pressure on the free end thereof to swing said wing members inwardly.

3. The device of claim 1 wherein said device is integrally formed of a synthetic organic thermoplastic polymeric resin and each of said wing members is hinged to said washer section by a self-formed hinge of reduced thickness.

4. The device of claim 3, wherein said closing means comprises an integrally formed finger depending from each of said wing members below the level of said washer section bottom face and swingable outwardly in response to pressure of the free end thereof to swing said respective wing members inwardly.

5. The device of claim 1 wherein each of said wings has upwardly converging side edges.

6. A fastener head covering device integrally formed of a synthetic organic polymeric resin and comprising a body member including a washer section having top and bottom faces and an opening for the reception of the shank of a fastener, a plurality of wing members peripherally spaced along and hinged to the border of said washer section by self-formed hinges and being of concave-convex configuration with converging side edges and closing means including an integrally formed finger depending from each of said wing members below the level of said washer section bottom face and swingable outwardly in response to pressure on the free ends thereof to swing said respective wing members inwardly into substantially interfitting closed positions overlying said washer top face to form a hollow dome.

7. The device of claim 6 wherein said hinges are of reduced thickness.

8. The device of claim 6 wherein each of said depending fingers is of pyramidal configurations having depending apex.

9. In combination with the device of claim 6, a screw including a threaded shank and an enlarged head, said washer section having an opening of lesser diameter than that of said screw shank and engaging said screw shank proximate said screw head to retain said device in said screw.

* * * * *